United States Patent

O'Brien et al.

[11] Patent Number: 6,120,327
[45] Date of Patent: Sep. 19, 2000

[54] FOAM WIRE HARNESS WITH SHAPE MEMORY

[75] Inventors: Timothy F. O'Brien, White Lake; Joseph J. Davis, Jr., Ortonville; Jeffrey A. Branch, Eastpointe; Michael Vincent Maher, Dearborn, all of Mich.

[73] Assignee: Lear Automotive Dearborn, Inc., Southfield, Mich.

[21] Appl. No.: 08/920,570

[22] Filed: Aug. 29, 1997

Related U.S. Application Data

[63] Continuation of application No. 08/898,663, Jul. 22, 1997, Pat. No. 6,069,319.

[51] Int. Cl.[7] .................................................. H01R 9/11
[52] U.S. Cl. ........................................ 439/623; 174/72 A
[58] Field of Search ................... 174/72 A; 307/10.1; 439/623, 624, 502, 505, 161

[56] References Cited

U.S. PATENT DOCUMENTS

| | | | |
|---|---|---|---|
| 3,946,768 | 3/1976 | Fiorentino | 140/92.1 |
| 3,985,951 | 10/1976 | Harris | 174/138 F |
| 4,270,961 | 6/1981 | Faranetta et al. | 156/51 |
| 4,444,705 | 4/1984 | Kumasaka et al. | 264/46.5 |
| 4,653,155 | 3/1987 | Hara | 24/16 PB |
| 4,781,619 | 11/1988 | Ikeda | 439/488 |
| 4,784,614 | 11/1988 | Sadigh-Behzadi | 439/488 |
| 4,822,956 | 4/1989 | Sepe | 174/103 |
| 4,891,012 | 1/1990 | Pajot | 439/34 |
| 4,923,537 | 5/1990 | Matsushima | 156/48 |
| 4,941,845 | 7/1990 | Eppley et al. | 439/505 |
| 5,030,116 | 7/1991 | Sakai et al. | 439/130 |
| 5,082,253 | 1/1992 | Suzuki et al. | 269/45 |
| 5,168,124 | 12/1992 | Takase et al. | 174/23 R |
| 5,230,146 | 7/1993 | Tsuji et al. | 29/861 |
| 5,338,014 | 8/1994 | Kitamura | 269/47 |
| 5,442,518 | 8/1995 | Beam | 361/690 |
| 5,490,664 | 2/1996 | Justus et al. | 269/66 |
| 5,500,179 | 3/1996 | Onishi et al. | 264/400 |
| 5,535,511 | 7/1996 | Karasik | 29/872 |
| 5,598,627 | 2/1997 | Saka et al. | 29/861 |
| 5,764,249 | 6/1998 | Fukada | 347/2 |
| 5,828,299 | 10/1998 | Chen | 340/468 |

FOREIGN PATENT DOCUMENTS

| | | |
|---|---|---|
| 0235924 | 1/1987 | European Pat. Off. . |
| 0247514 | of 1987 | European Pat. Off. . |
| 0284488 | of 1988 | European Pat. Off. . |
| 0418882 | of 1990 | European Pat. Off. . |
| 0288752 | of 1991 | European Pat. Off. . |

(List continued on next page.)

OTHER PUBLICATIONS

PCT Search Report PCT/US98/16955.

*Primary Examiner*—Lincoln Donovan
*Assistant Examiner*—Javaid Nasri
*Attorney, Agent, or Firm*—Brooks & Kushman P.C.

[57] ABSTRACT

A wire harness generally comprises a plurality of wires encased by a continuous, molded sheath. The wire harness generally includes a main trunk from which a plurality of branches extend. The sheath is formed continuously over the main trunk and branches. In one embodiment, the wire harness has an undeformed shape which substantially matches a surface of a component to which the wire harness is mounted.

27 Claims, 3 Drawing Sheets

FOREIGN PATENT DOCUMENTS

| | | |
|---|---|---|
| 0418882 | of 1993 | European Pat. Off. . |
| 0566969 | of 1993 | European Pat. Off. . |
| 0566970 | of 1993 | European Pat. Off. . |
| 0535712 | of 1995 | European Pat. Off. . |
| 0650315 | of 1995 | European Pat. Off. . |
| 0666172 | of 1995 | European Pat. Off. . |
| 0709252 | of 1995 | European Pat. Off. . |
| 0499042 | of 1996 | European Pat. Off. . |
| 0555811 | of 1996 | European Pat. Off. . |
| 0580053 | of 1997 | European Pat. Off. . |
| 0709252 | of 1998 | European Pat. Off. . |
| 2570399 | of 1986 | France . |
| 3208351 | of 1983 | Germany . |
| 3208352 | of 1984 | Germany . |
| 3208752 | of 1984 | Germany . |
| 3711187 | of 1988 | Germany . |
| 3712968 | of 1988 | Germany . |
| 3727187 | of 1989 | Germany . |
| 3220630 | of 1990 | Germany . |
| 3220657 | of 1990 | Germany . |
| 3915854 | of 1992 | Germany . |
| 4102659 | of 1992 | Germany . |
| 4212207 | of 1992 | Germany . |
| 4128306 | of 1993 | Germany . |
| 9511056 | of 1995 | Germany . |
| 19628850 | of 1996 | Germany . |
| 9543665 | of 1996 | Germany . |
| 9603885 | of 1996 | Germany . |
| 9604521 | of 1996 | Germany . |
| 9754236 | of 1998 | Germany . |
| WO9318565 | of 1993 | WIPO . |

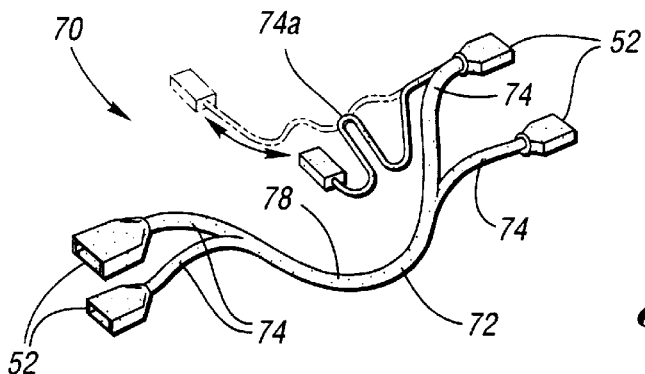
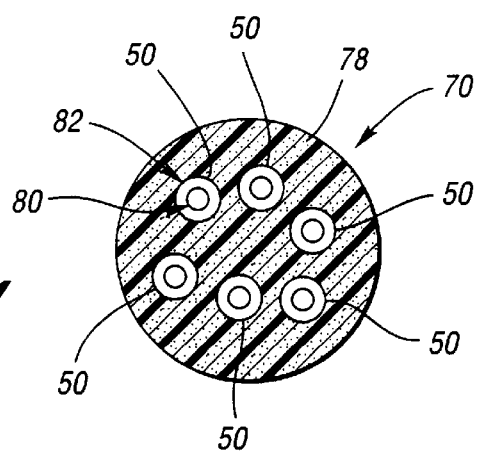
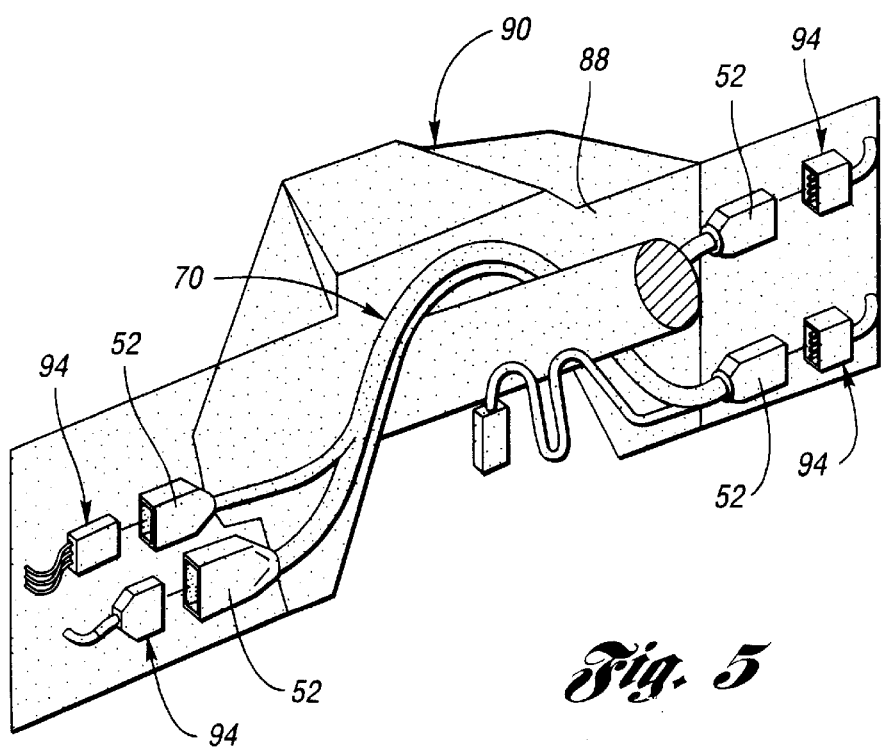

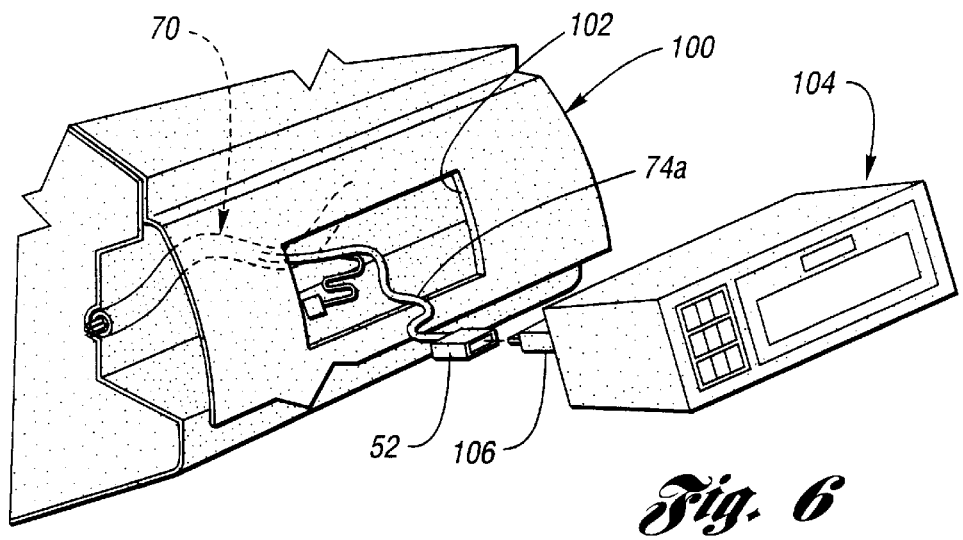
*Fig. 6*
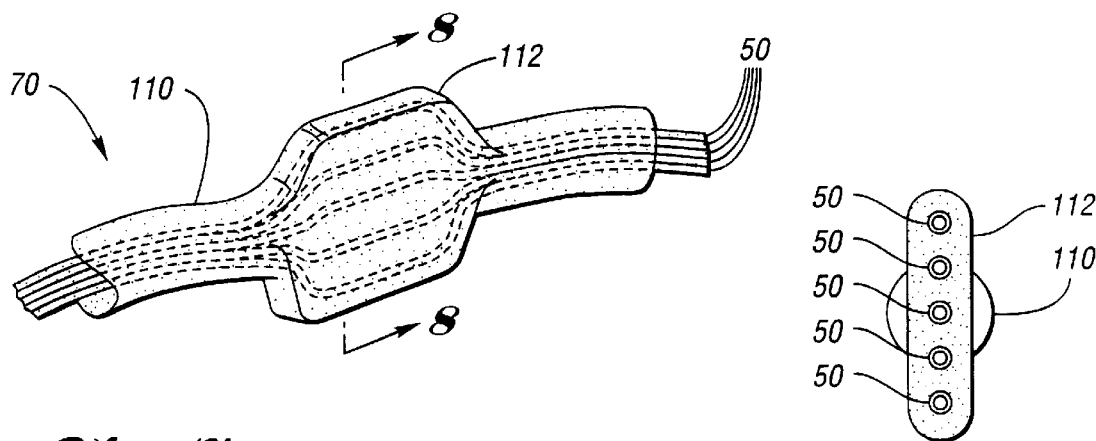
*Fig. 7*
*Fig. 8*
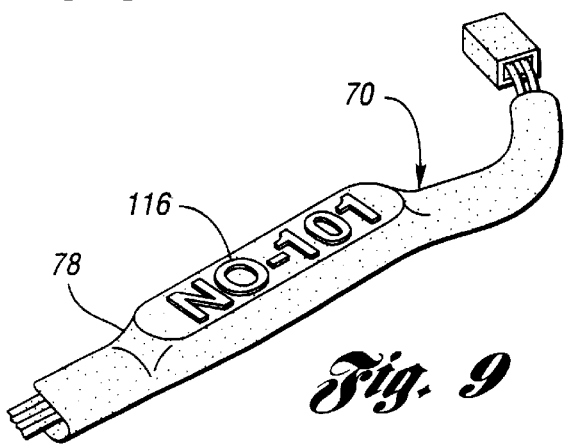
*Fig. 9*
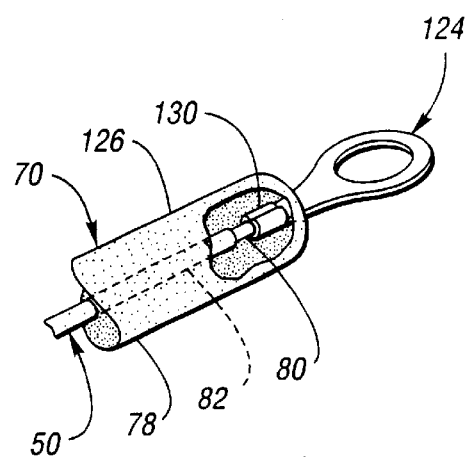
*Fig. 10*

FOAM WIRE HARNESS WITH SHAPE MEMORY

The application is a continuation in part of U.S. Ser. No. 08/898,663, filed on Jul. 22, 1997, now U.S. Pat. No. 6,069,319 and entitled "FOAMED-IN WIRE HARNESSES."

BACKGROUND OF THE INVENTION

The present invention relates generally to wire harnesses and more particularly to a wire harness having a foamed sheath having shape memory.

Current vehicles include numerous wire harnesses interconnecting an increasing number of electrical components to user-activated and computer-controlled switches and sensors. Each wire harness comprises a plurality of wires which are bundled to form a main trunk and a plurality of branches extending from the trunk. Typically, each of the branches includes an electrical connector at an outer end.

During assembly of wire harnesses, the wire bundles are held together in an assembly jig, which includes a plurality of wire supports supporting the wires along each of the main trunk and each of the branches. Each wire is placed into the assembly jig onto the appropriate wire supports, i.e. from a first branch at one end of the wire harness, through the main trunk and through a second branch, typically at an opposite end of the wire harness. Electrical connectors are then connected to the outer ends of the wires at the branches. The wires are then wrapped with tape along the entire length of the main trunk and each of the branches.

Plastic tubes or sleeves are often secured around the bundled wires in selected locations to protect against mechanical wear caused by vibration. Foam sheets are often wrapped and taped about the bundles in selected areas to provide damping and reduce noise. Fasteners, such as christmas tree connectors, are secured to the bundled wires with the wrapped tape. Rubber gaskets are secured to selected portions of the bundled wires in order to provide water seals at selected locations. Branch identifiers, such as tape labels are often wrapped about the branches near the connectors in order to identify the branch so it is properly mounted and connected.

SUMMARY OF THE INVENTION

The present invention provides a wire harness generally comprising a plurality of wires encased in a continuous polymer sheath. The wire harness preferably comprises a main trunk continuous with a plurality of branches extending from the main trunk. The sheath is preferably molded around and among the plurality of wires and is continuous over the main trunk and branches.

A mold for forming the wire harness of the present invention includes a trough having a main trunk continuous with a plurality of branches. The plurality of wires are placed in the trough of the mold, routing each wire along the appropriate branches and the main trunk. Electrical connectors are connected to the end of each wire. A polymer, preferably a foam, is then introduced into the mold. The polymer forms a continuous, molded sheath around and among the plurality of wires and continuous over the main trunk and each of the branches. Preferably, the shape of the trough approximates the shape of a surface of a component to which the wire harness is to be mounted. As a result, the wire harness has an undeformed shape which approximates the surface of the component. When the wire harness is mounted to the component and in an undeformed state, the electrical connectors on the ends of the branches of the wire harness are positioned adjacent corresponding electrical connectors on the component to which the wire harness is mounted. As a result, installation of the wire harness and connection of the connectors is facilitated. Further, fewer connectors are required to secure the wire harness to the component.

Preferably at least one branch of the wire harness is molded in a serpentine shape. When the wire harness is installed in the component, the serpentine branch can be stretched to a deformed, generally straightened, generally longer shape to facilitate connection to a complementary electrical connector. After connection, the serpentine branch tends to return to its shortened, serpentine shape, thereby retracting the branch and connectors out of the way and reducing noise and possible damage to the wires.

Other features and advantages of the present invention are described in the detailed description below.

BRIEF DESCRIPTION OF THE DRAWINGS

The above, as well as other advantages of the present invention, will become readily apparent to those skilled in the art from the following detailed description of a preferred embodiment when considered in the light of the accompanying drawings in which:

FIG. 3 is a perspective view of a wire harness formed in the mold of FIG. 1;

FIG. 4 is a sectional view taken along line 4—4 of FIG. 3;

FIG. 5 is a perspective view, partially broken away, of the wire harness of FIG. 3 installed on a component;

FIG. 6 is a perspective view, partially broken away, of the wire harness of FIG. 3 installed on another component;

FIG. 7 is a perspective view, partially broken away, of an alternate feature of the present invention;

FIG. 8 is a sectional view taken along line 8—8 of FIG. 7;

FIG. 9 is a perspective view, partially broken away, of an alternate feature of the present invention;

FIG. 10 is a perspective view, partially broken away, of an alternate connector to the wire harness of FIG. 3.

DETAILED DESCRIPTION OF A PREFERRED EMBODIMENT

Figure 1:
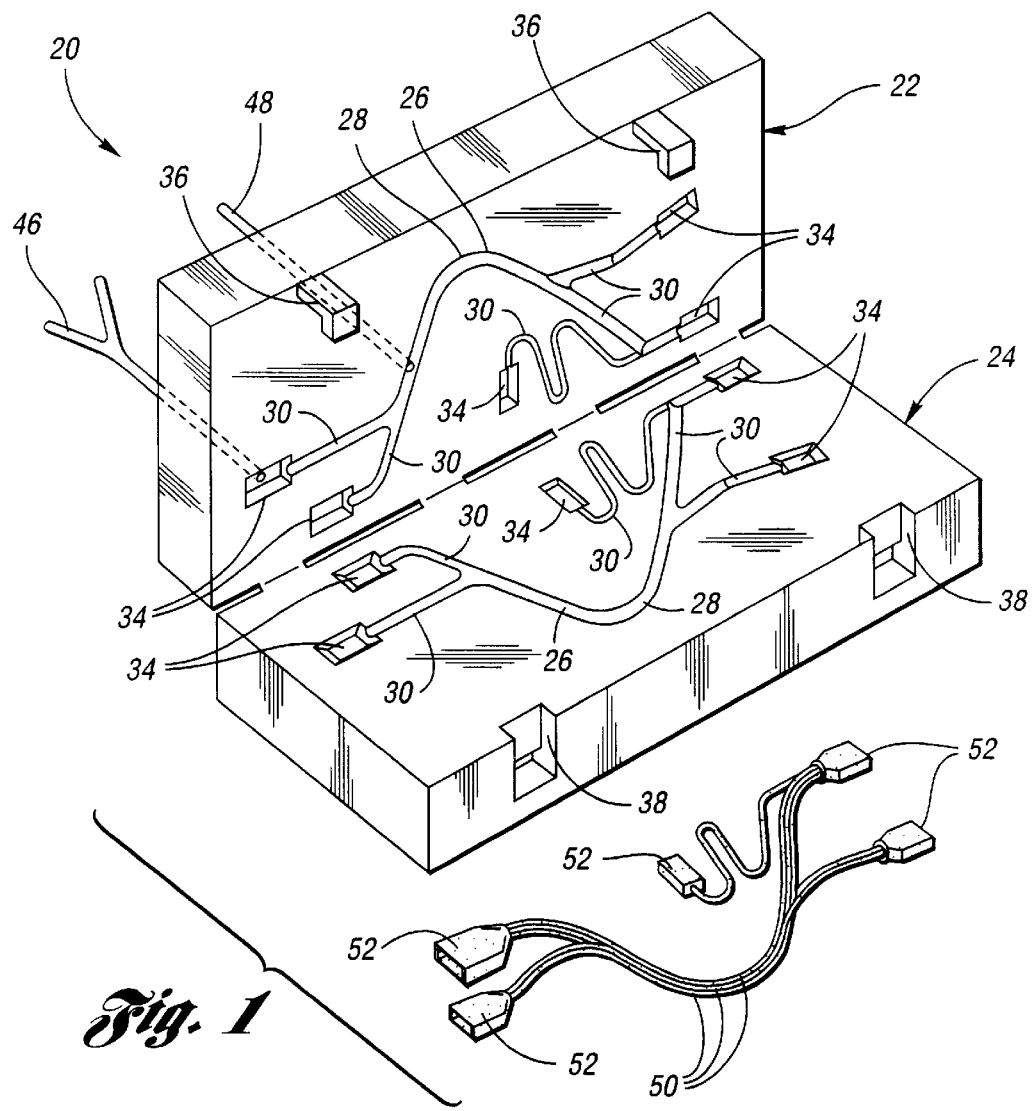
FIG. 1 is a perspective view of a mold for forming a wire harness.

A mold 20 for forming a wire harness according to the present invention is shown in FIG. 1 generally comprising an upper mold 22 hingably connected to a complementary lower mold 24. The upper mold 22 and lower mold include complementary troughs 26 each comprising a main trunk 28 continuous with a plurality of branches 30. A recess 34 is formed at an outer end of each of the branches 30. The upper mold 22 preferably includes a pair of hooks 36 complementary to latches 38 on the lower mold 24. As will be discussed below, the shape of the troughs 26 preferably matches a contour of a surface of a component.

A supply port 46 leads into the trough 26 of the upper mold 22. The supply port 46 supplies a polymer, preferably a two part foam such as Elastoflex® available from BASF; however other polymers could also be utilized. An excess port 48 is also in communication with the trough 26 of the upper mold 22 for removing excess polymer from the mold 20.

A plurality of wires 50 are routed in the trough 26 of the lower mold 24 along the main trunk 28 and branches 30. An electrical connector 52 is connected at each end of each wire 50. A plurality of wires 50 are preferably connected to each electrical connector 52.

Figure 2:
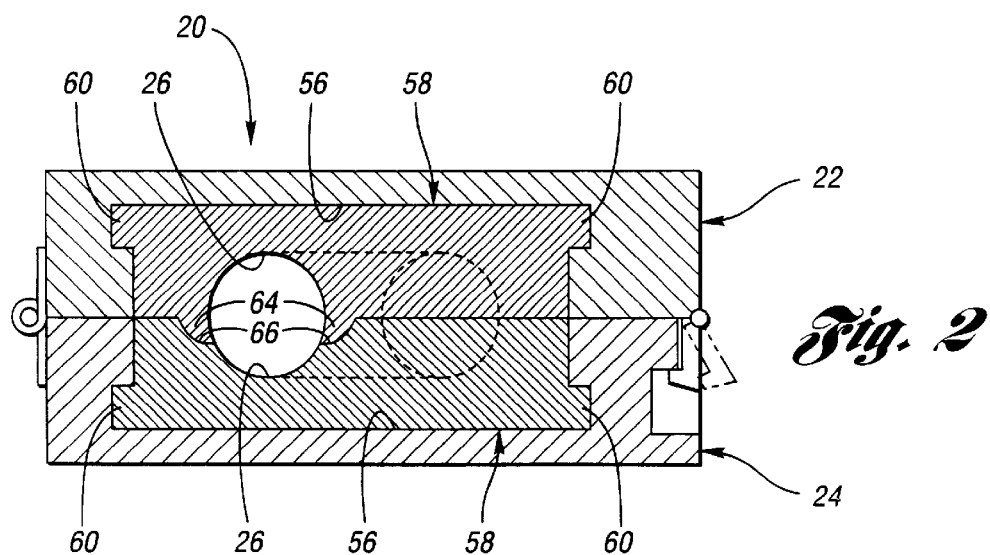
FIG. 2 is a sectional view of the mold of FIG. 1 in a closed position.

As can be seen in FIG. 2, the upper and lower molds 22, 24 preferably each include a cavity 56 into which is fitted a rubber seal 58 which defines the troughs 26. The rubber seal 58 include a plurality of protrusions 60 extending into the upper and lowers mold 22, 24 to retain the rubber seals 58 within the molds 22, 24. Preferably, the rubber seal 58 in the upper mold 22 includes ribs 64, which extend downwardly along the trough 26 and which fit into complementary grooves 66 along the trough 26 of the lower mold 24 in order to retain the polymer in the trough 26.

In operation, referring to FIG. 1, the wires 50 are routed and preferably connected to electrical connectors 52. The wires 50 may be spot-taped or temporarily bundled prior to being placed in the trough 26 of the lower mold 24. Alternatively, the wires 50 can be routed and assembled directly in the trough 26 of the lower mold 24 prior to connection of the electrical connectors 52. The wires 50 are routed along the main trunk 28 and branches 30, as appropriate, and connected to the appropriate electrical connectors 52 at each end. The upper mold 22 is then closed onto the lower mold 24 and the polymer foam is introduced through the supply port 46. The polymer flows through the troughs 26 of the upper and lower molds 22, 24 around and among the plurality of wires 50. After the polymer foam sets, the formed wire harness 70 is removed from the mold 20.

The formed wire harness 70 is shown in FIG. 3 generally comprising a main trunk 72 continuous with a plurality of branches 74 each having an electrical connector 52 at an outer end. The polymer foam forms a sheath 78 which is continuous over the main trunk 72 and branches 74. The sheath 78 is flexible and resilient and preferably has an undeformed shape which substantially matches the shape of the trough 26 of the mold 20. The branches 74 and main trunk 72 can be selectively deformed and bent to different positions, but upon release preferably return to the undeformed shape and position.

One of the branches 74a is preferably formed in a serpentine shape. The serpentine branch 74a has an undeformed serpentine shape having a first undeformed length. The serpentine branch 74a is selectively deformable to a second, extended position, in which the serpentine branch 74a is substantially straightened. Upon release, the serpentine branch 74a returns to its undeformed serpentine, shortened shape.

As can be seen in FIG. 4, the sheath 78 is molded around and among the plurality of wires 50. Each of the wires 50 comprises a conductor 80 surrounded by an insulator 82. The wires 50 are encased and protected by the sheath 78.

As can be seen in FIG. 5, the shape of the wire harness 70 approximates a surface 88 of a component 90, such as a vehicle instrument panel 90. When the wire harness 70 is installed onto the surface 88 and is in its undeformed shape, as shown, the electrical connectors 52 of the wire harness 70 are substantially aligned with corresponding electrical connectors 94 mounted on the component 90. This facilitates installation of the wire harness 70 and reduces the number of connectors required for securing the wire harness 70. Connection of the electrical connectors 52 is facilitated because the connectors 52 are automatically positioned adjacent the proper connectors on the component 90.

Referring to FIG. 6, the serpentine branch 74a of the wire harness 70 can be mounted adjacent a component 100 having an orifice 102 into which an electrical component 104 is to be mounted. The electrical component 104 includes an electrical connector 106 complementary to connector 52 on the outer end of the serpentine branch 74a. As can be seen in FIG. 6, when the serpentine branch 74a is in its undeformed, shortened, serpentine shape, its connector 52 is retracted away from orifice 102 in the component 100. During installation of the electrical component 104 into the orifice 102, the connector 52 of the serpentine branch 74a can be grasped and extended to a deformed, generally straightened, lengthened shape, as shown. In the extended position, the connector 106 of the electrical component 104 can easily be connected to the connector 5a of the branch 74a. During subsequent installation of the electrical component 104 into the orifice 102, the shape memory of the serpentine branch 74a will assist in retracting the connectors 52, 106 into the orifice 102 and prevent pinching of the wire harness 70 by the electrical component 104. Further, the shape memory of the serpentine branch 74a will also reduce any noise by the branch 74a or connectors 52, 106. The electrical component 104 could be a radio 104 installed into a dashboard 100 of a vehicle.

FIG. 7 illustrates an alternate branch 110 of the present invention having a section 112 of altered cross section. Preferably, the section 112 is a "flattened" section 112 of the wire harness 70. As can be seen in FIG. 8, the wires 50 in the flattened section 112 are generally arranged along a line, thereby reducing one dimension of the branch 110. The flattened section 112 could be utilized to pass the wire harness 110 through a narrow passageway. It should be apparent that the flattened section 112 could be formed into any portion of the wire harness 70 of FIGS. 1–6.

FIG. 9 illustrates an alternate feature of the present invention, in which text 116, such as a part number or identifier of the branch is molded directly into the sheath of the wire harness 70. It should be apparent that the molded text 116 could be formed in the wire harness 70 of FIGS. 1–6.

An alternate connector 124, specifically an eyelet connector 124, is shown in FIG. 10 connected to an alternate branch 126 of the wire harness 70 of the present invention. The branch 126 includes at least one wire 50 encased in a sheath 78 formed as described above. The wire 50 includes a conductor 80 surrounded by an insulator 82. A portion of the insulator 82 is removed from the outer end of the wire 50. The exposed conductor 80 is electrically connected to the eyelet connector 124 by a crimp 130 in the eyelet connector 124. The wire 50, exposed conductor 80, insulator 82 and the crimp 130 of the eyelet connector 124 are encased and sealed by the sheath 78, thereby protecting the connection and sealing it from moisture.

Although the wire harness of the present invention has been described with respect to vehicle components, it should be apparent that the wire harness of the present invention would also be useful for other components. Further, although a foam polymer is preferred, it should be apparent that other materials could also be utilized as the sheath of the wire harness.

In accordance with the provisions of the patent statutes and jurisprudence, exemplary configurations described above are considered to represent a preferred embodiment of the invention. However, it should be noted that the invention can be practiced otherwise than as specifically illustrated and described without departing from its spirit or scope.

What is claimed is:

1. A wire harness comprising:
   a main trunk having a plurality of first wires and a plurality of second wires, said main trunk branching into a first branch and a second branch;
      said first branch extending from said main trunk, said first branch including said plurality of first wires;
      said second branch extending from said main trunk, said second branch including said plurality of second wires;
      said main trunk, said first branch and said second branch encased in a molded continuous sheath having an undeformed molded shape, said sheaf further being deformable and having an elastic memory of said undeformed molded shape.

2. The wire harness of claim 1 wherein said sheath is a polymer.

3. The wire harness of claim 1 wherein said sheath generally bundles said first and second wires in said main trunk, said sheath generally bundles said first wires in said first branch, and said sheath generally bundles said second wires in said second branch.

4. The wire harness of claim 1 wherein said sheath is molded around and among each of said plurality of wires.

5. The wire harness of claim 1 wherein said undeformed molded shape matches that of a contoured surface.

6. The wire harness of claim 1 further including indicia molded into said sheath.

7. The wire harness of claim 1 further including an electrical connector at an end of said first branch, said electrical connector electrically connected to said first wires and being adapted to be connected to a corresponding electrical connector of a component.

8. The wire harness of claim 7 wherein said sheath seals said wires and said electrical connector.

9. The wire harness of claim 7 wherein said sheath over said first branch has an undeformed shape of a first overall length of said first branch, said first branch being deformable to a generally straightened position of a second overall length greater than said first overall length to facilitate connecting said electrical connector to the corresponding electrical connector of the component.

10. The wire harness of claim 9 wherein said undeformed shape of said sheath over said first branch is generally serpentine.

11. The wire harness of claim 9 wherein said first branch is retractable from said generally straightened position after being deformed to said generally straightened position so as to retract said electrical connector and the corresponding electrical connector of the component.

12. The wire harness of claim 7 wherein said electrical connector is an eyelet connector.

13. The wire harness of claim 1 wherein said first wires each have a first end and a second end, at least one first electrical connector electrically connected to said first ends of said first wires, at least one second electrical connector electrically connected to said second ends of said first wires, said sheath encasing said plurality of first wires continuously from said first electrical connector to said second electrical connector.

14. The wire harness of claim 13 wherein said second wires each have a first end and a second end, at least one third electrical connector electrically connected to said first ends of said second wires, said sheath encasing said first and second wires continuously from said first electrical connector to said second electrical connector to said third electrical connector.

15. A wire harness and component combination comprising:
   a component having a surface and a plurality of electrical connectors adjacent said surface at a plurality of locations;
   a wire harness including a plurality of wires encased by a molded sheath having an undeformed molded shape, said wire harness including a main trunk branching into a plurality of branches, each of said branches having an electrical connector electrically connected to a subset of said plurality of wires, said molded sheath being continuously molded over said main trunk and plurality of branches, said molded sheath being deformable and having an elastic memory of said undeformed molded shape;
   said wire harnesses mounted on said surface of said component, said electrical connectors on said wire harness electrically connected to electrical connectors on said component, said electrical connectors of said wire harness being positioned adjacent corresponding electrical connectors on said component when said wire harness is mounted on said component and said sheath is in said undeformed molded shape.

16. The wire harness and component combination of claim 15 wherein said undeformed shape of said molded sheath substantially matches said surface of said component.

17. The wire harness and component combination of claim 15 wherein said sheath is a polymer.

18. The wire harness and component combination of claim 15 wherein said sheath is molded around and among each of said plurality of wires.

19. The wire harness and component combination of claim 15 wherein said sheath over a first branch has an undeformed shape generally of a first overall length of said first branch, said first branch being deformable to a generally straightened position of a second overall length greater than said first overall length to facilitate connection of a first electrical connector of said first branch to a corresponding first electrical connector of said component.

20. The wire harness and component combination of claim 19 wherein said undeformed shape of said sheath over said first branch is generally serpentine.

21. The wire harness and component combination of claim 19 wherein said sheath over said first bunch is retractable from said second overall length after being deformed to said second overall length so as to retract said first electrical connectors.

22. The wire harness and component combination of claim 15 further including indicia molded into said sheath.

23. The wire harness and component combination of claim 15 wherein at least one of said electrical connectors on said wire harness is an eyelet connector.

24. A wire harness comprising:
   a plurality of wires encased in a molded sheath, said sheath having indicia molded therein.

25. A wire harness and component combination comprising:
   a component having a surface and a plurality of electrical connectors adjacent said surface at a plurality of locations; and
   a wire harness including a plurality of wires encased in a sheath, said wire harness further including a main trunk branching into a plurality of branches, each of said branches having an electrical connector electrically connected to a subset of said plurality of wires, said sheath being continuously molded around said main trunk and plurality of branches;

wherein said wire harness is mounted on said surface of said component, said electrical connectors of said wire harness are electrically connected to said electrical connectors of said component, said sheath over a first branch has an undeformed shape generally of a first overall length, said first branch being deformable to a lengthened shape having a second overall length greater than said first overall length to facilitate connection of a first electrical connector of said first branch to a corresponding first electrical connector of said component, and said first branch being retractable from said lengthened shape so as to retract said first electrical connectors.

26. The wire harness and component combination of claim 25 wherein said lengthened shape is generally straight.

27. The wire harness and component combination of claim 25 wherein said undeformed shape of said sheath over said first branch is generally serpentine.

* * * * *

UNITED STATES PATENT AND TRADEMARK OFFICE
CERTIFICATE OF CORRECTION

PATENT NO : 6,120,327
DATED : September 19, 2000
INVENTOR(S) : Timothy F. O'Brien et al.

It is certified that error appears in the above-identified patent and that said Letters Patent are hereby corrected as shown below:

Column 5, Claim 1, line 13, delete "sheaf" and insert therefor --sheath--.

Column 6, Claim 15, line 16, delete "harnesses" and insert therefor --harness--.

Claim 6, line 25, Claim 16: before "shape" insert --molded--.

Signed and Sealed this

Fifteenth Day of May, 2001

Attest:

NICHOLAS P. GODICI

Attesting Officer

Acting Director of the United States Patent and Trademark Office